United States Patent [19]
Thoma et al.

[11] Patent Number: 6,141,089
[45] Date of Patent: *Oct. 31, 2000

[54] OPTICAL TIME DOMAIN REFLECTOMETER FOR MEASUREMENTS IN OPTICAL NETWORKS WITH CURRENTLY APPLIED TRAFFIC SIGNALS

[75] Inventors: Peter Thoma, Rottenberg; Peter Hoffmann, Boeblingen, both of Germany

[73] Assignee: Hewlett-Packard Company, Fort Collins, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,750

[22] Filed: Nov. 26, 1997

[30] Foreign Application Priority Data

Jan. 16, 1997 [DE] Germany .............................. 197 01 256
Jan. 17, 1997 [DE] Germany .............................. 197 01 453
Jun. 26, 1997 [EP] European Pat. Off. .............. 97110474

[51] Int. Cl.$^7$ ................................................. G01N 21/00
[52] U.S. Cl. ..................................................... 356/73.1
[58] Field of Search ............................................ 356/73.1

[56] References Cited

U.S. PATENT DOCUMENTS

| | | | |
|---|---|---|---|
| 4,591,231 | 5/1986 | Kaiser et al. | 356/96.18 |
| 4,737,026 | 4/1988 | Dalgoutte et al. | 356/73.1 |
| 4,749,247 | 6/1988 | Large | 356/73.1 |
| 5,453,827 | 9/1995 | Lee | 356/73.1 |
| 5,589,933 | 12/1996 | Osgood et al. | 356/73.1 |

FOREIGN PATENT DOCUMENTS

0 530 025 A2  3/1993  European Pat. Off. .

*Primary Examiner*—Robert Kim
*Attorney, Agent, or Firm*—Ohlandt, Greeley, Ruggiero & Perle, L.L.P.

[57] ABSTRACT

In an optical time domain reflectometer for the measurement in optical networks with currently applied traffic signals a switchable filter device Is positioned before a detector unit for the measurement of the reflected optical signals caused by an optical measurement section. The filter device includes an optical path into which one or more optical filters can be inserted reversibly, e.g. by an actuator. Communication signals present on the measurement section are attenuated by the filter(s) and the detector unit is able to detect the reflected signals undisturbed by the communication signals.

20 Claims, 2 Drawing Sheets

OPTICAL TIME DOMAIN REFLECTOMETER FOR MEASUREMENTS IN OPTICAL NETWORKS WITH CURRENTLY APPLIED TRAFFIC SIGNALS

FIELD OF THE INVENTION

The invention relates to a measuring instrument and more particularly, to an optical time domain reflectometer which performs measurements in the presence of traffic signals.

BACKGROUND OF THE ART

Optical time domain reflectometers (OTDRs) usually are employed for monitoring and error analysis of optical fibers and networks. Typically the communication traffic on a segment to be measured is switched off for the measurement. A permanent or at least periodic monitoring allows for an early intervention if degradation occurs and gives advance warning to the network operator before network failure.

More recent networks use multiple wavelengths for data transmission. In some cases transmission takes place in both directions of a line, alternately. For monitoring and characterization or measurement of such a network, a measuring wavelength different from the communication signals (traffic signals) has to be used in order to prevent the measuring signal—i.e. the signal being backscattered or reflected from the network when the measuring wavelength is applied—being distorted or too strongly attenuated for a meaningful measurement.

An object of the invention is to propose a measuring instrument for the measurement of reflected optical signals to test the operational ability of an optical network.

SUMMARY OF THE INVENTION

A concept of the invention is to position a switchable filter unit before a detector unit for the measurement of optical signals being reflected by an optical measurement section. The filter unit suppresses or at least strongly attenuates communication signals with one or more different wavelengths on the measurement section and allows for transmission of the reflected optical measuring signals to the optical detector unit e.g. an avalanche photo diode (APD).

The inventive measuring instrument serves especially for the measurement of reflected signals of an optical measurement section, as e.g. on fiber optical networks, parts or sections of a network or on optical components in such networks. In an OTDR for measurement of reflected optical signals, a measuring signal with a measuring wavelength is coupled into the measurement section and the reflected signal to be measured is detected with an optical detector unit and passed to a computer for quantitative analysis and visual representation.

To be able to carry out measurements in a network during operation with communication signals, the invention proposes to generate a signal of a measuring wavelength which differs from the communication signals and to couple it into the measurement section. Preferably a measuring signal is coupled in with a wavelength longer than the longest wavelength of the communication signals.

To enable correct measurement the invention proposes to position a switchable filter unit in the optical path between the measurement section and optical measuring unit. The filter unit allows for transmission of the signals scattered or reflected optically by the measurement section, to the detector unit and attenuates the communication signals to a sufficient extent, thereby avoiding or at least strongly reducing their effect on the detector unit.

According to an advantageous embodiment of the invention, the inventive filter device is designed to accommodate some or even all optical filters necessary to keep all usually applied communication signals back from the detector unit (APD).

In another advantageous embodiment of the invention, successively, all filters available in the filter device are put into the optical path between measurement section and detector unit (APD). If the insertion of a filter for a specific wavelength has no influence on the measured signal returned from the detector unit (APD), it indicates the absence of communication signals with the wavelength of the filter on the measurement section. Such a wavelength is suitable for a later measurement of the measurement section. If the insertion of a filter for a specific wavelength has an effect on the measured signal returned from the detector unit (APD), this is, by contrast, a sign of the presence of a communication signal with corresponding wavelength on the measurement section and that such a wavelength should not be used for a measurement of the measurement section (so as to keep the influence on the reflected signals of the measurement section small).

For practical reasons, it is intended that the filters of a wavelength, the insertion of which into the optical path have an influence on the measured signal returned from the detector unit (APD), be left in the optical path in preparation for the measurement and filters of a wavelength without influence be removed from the optical path in preparation for the measurement. If all available filters of the inventive filter device are inserted into the optical path, it is established which measuring wavelength of the inventive measuring instrument can be used for the measurement of the measurement section. If this has not been done already in the preparation of the measurement, at least the filter of this measuring wavelength is removed from the optical path before the actual measurement takes place on the measurement section with applied communication signals.

It is understood that the detector unit can also be used for registration of the optical power present on the optical measurement section, if no filter is introduced into the inventive filter unit.

For practical reasons a control unit for mechanical movements of the filters into the optical path of the filter device is provided, which can be implemented as a hardware solution or as a software solution and, for convenience, carries out or gives rise to the mechanical and electrical settings for the measurement on the measuring instrument and its components. As described before it is established which measuring wavelength for practical considerations should be used for a measurement of the measurement section.

In another advantageous embodiment of the invention, one or more signal sources for the generation of the usually employed measuring wavelengths are provided, which can be identical with the usual communication signals.

In another advantageous embodiment of the invention, a control (hardware or software solution) is provided in the inventive measuring instrument to control the wavelength of a signal source→as already described—for emission of a measuring signal into the measurement section. The inventive measuring instrument then determines the measurement of the reflected signals via the detector unit (APD) and the computing unit which follows. It can be useful to display the measured data visually or to feed them into a comparator, which e.g. at a given departure causes an alert. Hence important optical networks for example can be monitored with respect to their operational ability permanently without human involvement. Furthermore the inventive measuring instrument may comprise minimal equipment with filters in the inventive filter device, which are adapted to the concrete communication signals on the network.

From the description hitherto it is obvious that the invention allows for the realization of a fully automatic lo measuring instrument for measurements of the operational ability of optical measurement sections with applied communication signals without need for switching off the measurement section to carry out the measurement.

Furthermore, it is advantageous that an inventive measuring device is available for carrying out measurements on optical measurement sections with applied communication signals, which requires only one connection to the measurement section and only one detector unit (APD) With a single component, a flexible and cost saving adaptation of the measuring wavelength for the communication wavelengths present on the measurement section is possible. Depending on the wavelength of the communication signals present on the measurement section different filter arrangements such as high-pass, low-pass, or band-pass can be inserted into the inventive filter device.

This also allows the use of the inventive measuring instrument in so-called WDM systems (wavelength division multiplexing), in which a multitude of communication signals of different wavelength (communication channels) with small differences (typically 2 nm) are present and the measuring wavelength in the inventive measuring system can be chosen such that the measuring wavelength fits to a free channel.

In addition the inventive switchable filter device can be fitted into existing optical time domain reflectometers (OTDRs) by placing it between the output of an existing measuring instrument and the measurement section to be tested.

In one implementation of the invention, the inventive measuring instrument has one or more signal sources for the generation of measuring wavelengths, which are longer than the wavelength of the communication signals on the measurement section. Preferably in the inventive measuring instrument optical signal sources are intended, which generate a measuring wavelength of 1.65 $\mu$m, 1.55 $\mu$m, and/or 1.31 $\mu$m (wavelengths of customary communication signals) for the measurement of the measurement section. As described to prevent disturbance of the measurement by communication signals of equal wavelength, a signal, preferably from the set of measuring wavelengths available in the inventive measuring instrument, of such a measuring wavelength is coupled into the measurement section, which differs from the wavelengths of the communication signals present on the measurement section. In case the wavelength of one on the customary or possible communication signals for the measurement section is not used on it, the measuring wavelength can also be the wavelength of a communication signal.

For the generation of signals with measuring wavelengths in the inventive measuring instrument, an OTDR module is provided with a first laser source, a second laser source and a third laser source for the generation of the measuring wavelengths mentioned before. It is understood, that more or fewer sources for the generation of a signal having a suitable provided. Equally, the optical sources can be designed in a way as to generate measuring wavelengths different from the aforementioned measuring wavelengths, provided they are suited for a measurement of the optical measurement section. The choice of the intended measuring wavelength will be orientated especially on the communication networks the inventive measure instrument is designed for and the communication wavelengths usually present on the communication network.

In a further embodiment of the invention, it is intended to connect at least one wavelength-dependent coupler each between the output of the inventive measuring instrument and a signal source for the generation of a measuring wavelength. Equally, between any two signal sources, a wavelength-dependent coupler is intended. The measuring wavelength emerging from the last wavelength-dependent coupler in a direction of the output of the measuring instrument is connected, via an optical fiber, to the input of a wavelength-independent coupler. The input of the wavelength-independent coupler is also connected to a detector unit (APD) via the inventive switchable filter device with one or more optical fibers in between them. The output of the wavelength-dependent coupler is connected to the output for connection to the measurement section of the inventive measuring instrument via an optical fiber. The output of the wavelength-independent coupler is connected to a monitor photo diode, also via an optical fiber.

The monitor photo diode detects the signal fed into the measurement section and allows for the construction of a control circuit, which compares the wavelength and/or the signal height of the measuring wavelength with a reference value and, if necessary, adjusts it by influencing the signal sources. To feed only one measuring wavelength into the measurement section, it can be intended that the control unit of the measuring instrument controls only one single suitable signal source. It can also be intended, that all signal sources are employed for the generation of the available measuring wavelengths and an electrically actuated blocking device is assigned to each signal source, which are altogether wired in a way that only the selected suitable measuring wavelength is passed through to the output of the measuring instrument.

In a preferred embodiment of the invention, one or all signal sources for the generation of a measuring wavelength are built from laser diodes which, for example, emit a wavelength of 1.31 $\mu$m, 1.55 $\mu$m, or 1.65 $\mu$m. The detector unit, e.g., can be built with an avalanche photo diode (APD).

Preferably, the switchable filter device (SWF) is arranged in the optical path between the detector unit (APD) and the input of the wavelength-independent coupler (WIC). The switchable filter device (SWF) can be also arranged in the optical path between the output of the wavelength-independent coupler (WIC) and the port of the measuring instrument (OTDR port) for connecting the measuring instrument with the measuring section. Equally the switchable filter device (SWF) can be positioned between the output of the inventive or an existing measuring instrument, e.g. for fitting an existing measuring instrument and the measurement section to be tested.

In an embodiment of the invention, the switchable filter device (SWF) has a first optical lens at its input and a second optical lens at its output. In the optical path between the first and second lens one or more optical filters are provided for the attenuation of the communication signals present on the optical measurement section. For example, the optical filters can be moved with manually or electrically operated actuators, e.g. by the operator or preferably via a control provided with the inventive control, as described.

The switchable filter device (SWF) can consist of a multitude of optical filters for different wavelengths, especially for 1.31 µm, 1.55 µm and/or 1.65 µm which are connected in series and can be moved into the optical path. On the axis of an actuator one or more filters can also be built in, which can be moved into the optical path of the switchable filter device (SWF) one after another and/or stacked e.g. in the form of a slider or a filter wheel with several filters rotating through the optical path.

In another embodiment of the invention, on the actuator axis one or more optical filters are placed which can be tilted by the actuator in the optical path of the switchable filter device (SWF). Especially in the case of wavelengths of communication signals lying close to each other, such a solution enables the switchable filter device (SWF) to manage with a small number of optical filters, because the wavelength influenced by a filter and the filter characteristics depends on the angle under which the filter is positioned in the optical path.

One or more of the actuators influencing the switchable filter device (SWF) can be designed in a way that one or more optical filters of the switchable filter device (SWF) can be moved into the optical path by rotation, tilting or wobbling. The actuator can be driven e.g. electrically by a rotating magnet, a stepping motor or a linear drive and/or a wobble plate can be used. When using a wobble plate it is advantageous that a small change in the tilt angle of the filters brought into the optical path of the switchable filter device (SWF) is made possible at a large angle of rotation.

In another embodiment of the invention, one or more of the filters of the switchable filter device (SWF) are built from an electrically controllable acousto-optical filter.

In a further embodiment of the invention, the detector unit (APD) is connected directly and not via an optical fiber to the lens of the output of the switchable filter device (SWF). If the detector unit (APD) is connected to the lens of the output of the switchable filter device (SWF) via an optical fiber, this is preferably done not via a thin, so-called single-mode fiber, which usually has a thickness of 9 µm, but instead via a thick optical fiber with a thickness of, for example, 50 µm. If a customary 9 µm thick fiber is located preferably at the input of the switchable filter device (SWF), there is a mapping from the small to the large fiber. This leads to a high thermal stability of the inventive arrangement and additionally allows for an easier adjustment.

In an embodiment of the invention, collimating, gradient, spherical and/or dichroic lenses are provided at the input or output of the inventive switchable filter device (SWF) before and behind the optical path.

The housing of the switchable filter device (SWF) can be made of metal, for example, in which a bore for the optical path is provided. In addition, a conical bore can be located to the left and/or to the right of the bore at the input and/or the output of the switchable filter device (SWF) each to accommodate an optical fiber.

For a mobile arrangement of the filters of the switchable filter device (SWF) in the optical path one or more forks for mounting the filters in the fashion of a throttle valve in a carburetor can be provided, which are, for example, arranged in series in the optical path of the switchable filter device.

Equally, one or more filters of the switchable filter device (SWF) can be moved manually or electrically, into the optical path of the switchable filter device (SWF) in the fashion of a sealing cap actuated at its border at the housing of the switchable filter device.

It is understood, and moreover emphasized explicitly, that the available invention refers to all useful and new combinations of the aforementioned features standing alone as well as in any combination. Furthermore, all advantages stated may be regarded at as solutions of the tasks and problems given with the invention.

Subsequently the invention is explained in more detail with a simple sample embodiment.

DETAILED DESCRIPTION OF THE INVENTION

Figure 1:
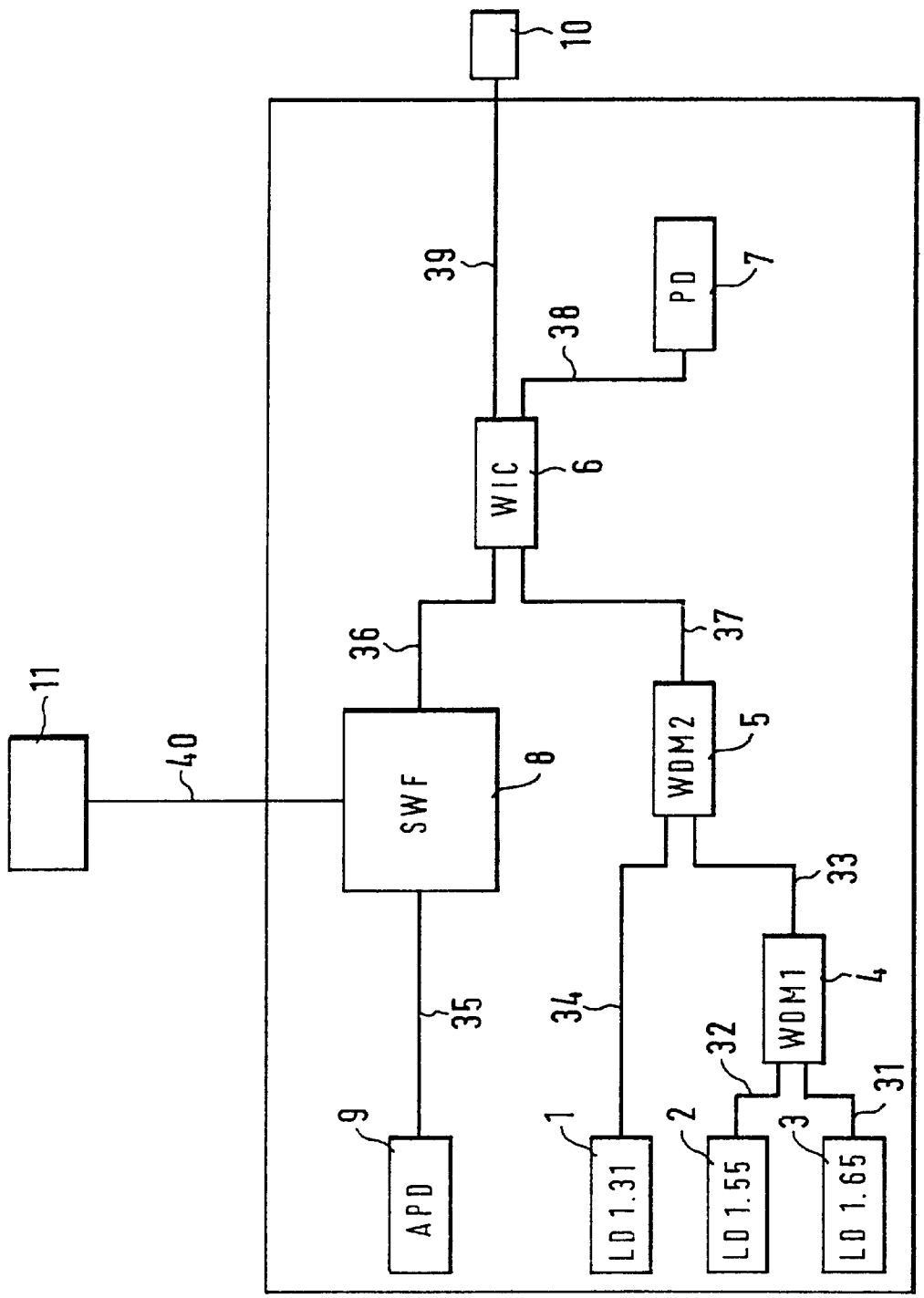
FIG. 1 A module of the inventive measuring instrument with a switchable filter device, three signal sources and a detector unit for the measurement of the signals reflected from the measurement section.

A module of the inventive measuring instrument according to FIG. 1 contains a first laser source 1 (LD 1.31), a second laser source 2 (LD 1.55) and a third laser source 3 (LD 1.65). The second and the third laser source 2 and 3 are connected to the input of a wavelength-dependent coupler 4 (WDM 1) via optical fibers 31 and 32. A second wavelength dependent coupler 5 (WDM 2) is connected at its input with the first laser source 1 via an optical fiber 34 and also at its input with the output of the first wavelength-dependent coupler 4. The output of the second wavelength-dependent coupler 5 is in connected to the input of a wavelength-independent coupler 6 (WIC 6) via an optical fiber 37. Furthermore the input of the coupler 6 is connected with the input of the inventive switchable filter device 8 (SWF) via an optical fiber 36. The output of the switchable filter unit 8 (SWF) is connected to the optical detector unit 9, for example an avalanche photo diode (APD) via an optical fiber 35. Via an electric wire 40 the switchable filter device 8 (SWF) is connected to a final control element 11. The output of the wavelength-independent coupler 6 (WIC) is connected with an monitor photo diode 7 (PD) via an optical fiber 38 and with the output 10 of the inventive measuring instrument via an optical fiber 39.

Figure 2:
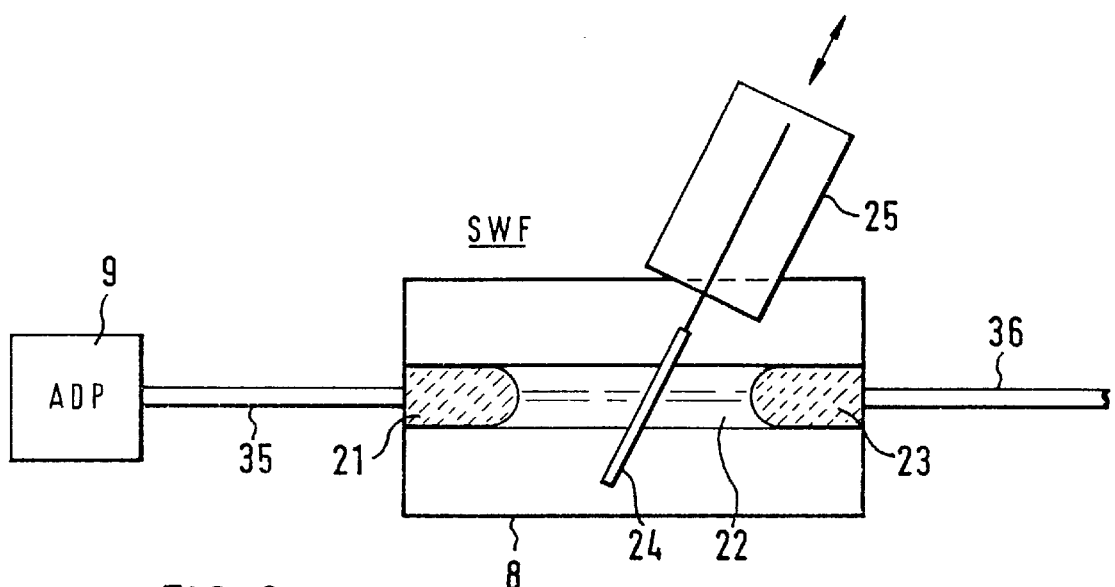
FIG. 2 a detailed representation of the inventive switchable filter device.

A simple filter device 8 (SWF), according to FIG. 2, comprises a metal housing with a bore 22, which forms an optical path. At the input of the filter device 8 (SWF), a conical bore (not shown) is provided to accommodate the optical fiber 36 and at the output of the filter device a conical bore (not shown) is provided to accommodate the optical fiber 35, which at its other end is connected optically to the photo diode 9 (APD). With an actuator 25, an optical filter 24 can be inserted reversibly in the way of a slider into the optical path of the filter device 8 (SWF). Between the optical fiber 36 and the optical path 22 a collimating lens 23 and between the optical fiber 35 and the optical path a collimating lens 21 is positioned. The reflected signals emitted by the optical measurement section to be measured are led into the optical detector unit via lens 23, the optical path 22 and lens 21.

Figure 3:
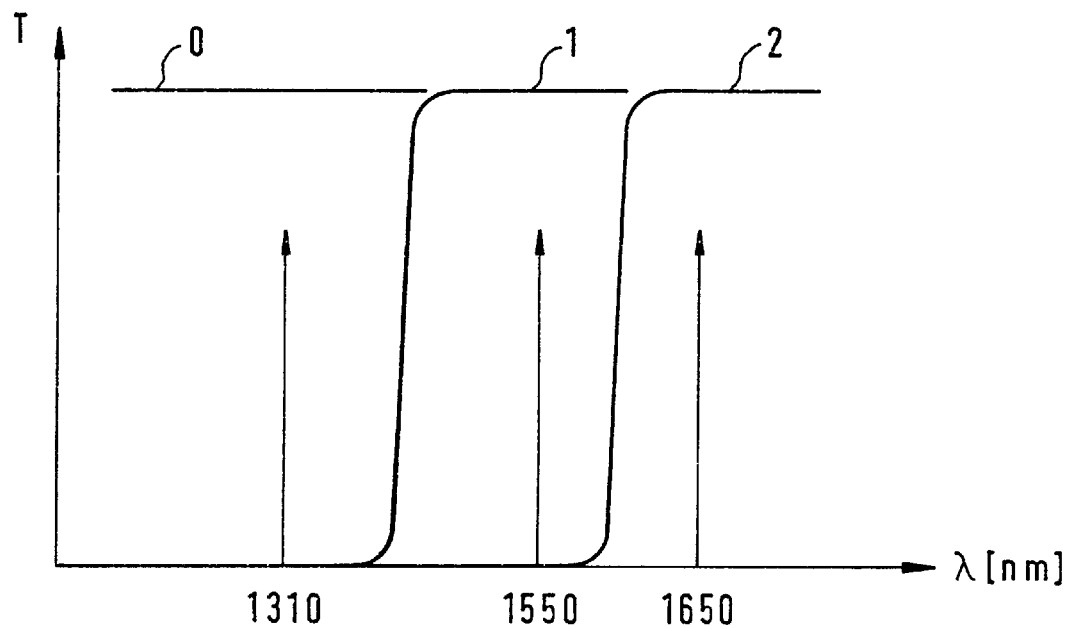
FIG. 3 a representation of the transmission T of the optical path of the switchable filter device as a function of the wavelength λ with and without communication signals on the optical measurement section to be measured.

FIG. 3 displays the transmission T of the optical path of the switchable filter device as a function of the wavelength λ for three typical cases.

In the first case, 0, no communication signals are present on the measurement section. The module according to FIG.

1 shows a measure signal of the wavelength 1310 nm or 1550 nm, or 1650 nm at the output. No optical filter of the filter device 8 is brought into the optical path. The transmission of the optical path is high. In the diagram (transmission T versus wavelength λ) of FIG. 3 this is shown by a line named 0 parallel to the X-axis.

In the second case, 1, the measurement section exhibits communication signals with a wavelength of 1310 nm. The filter 24 shown in FIG. 2, which attenuates wavelengths in the region of 1310 nm is brought into the optical path of the switchable filter unit 8 (SWF). The module according to FIG. 1 shows a measuring signal with a wavelength of 1550 nm or 1650 nm at its output, the measuring signal being fed into the measurement section to be measured and the measuring signals reflected from the measurement section being led to the detector unit (APD) via the inventive filter device, as can be seen from FIGS. 1 and 2. The transmission of the optical path is near zero for 1310 nm and wavelengths in the region of 1550 nm or 1650 nm are passing almost unhindered.

This is represented by transmission plot 1 in FIG. 3. Transmission plot 1 shows, that the transmission of the optical path 22 in FIG. 2 is near zero in the region of 1310 nm, sharply increasing in the region below 1550 nm and reaching its maximum value in the region of 1550 nm and above. For wavelengths in the region of 1550 nm and above the optical path 22 in FIG. 2 behaves nearly as if no filter is inserted into the optical path of the inventive filter device.

In the third case, 2, the measurement section exhibits communication signals with a wavelength of 1310 nm and 1550 nm. Instead of the filter 24 represented in FIG. 2 a filter not shown is brought into the optical path of the switchable filter device 8 (SWF) and the module according to FIG. 1 exhibits a measuring signal of the wavelength 1650 nm at its output. The filter of the inventive filter device shows a characteristic of transmission according to the transmission plot 2 represented in FIG. 3. The transmission of the optical path is near zero for 1310 nm and for 1550 nm and wavelengths in the region of 1650 nm can pass nearly unhindered and the reflected signals of the measurement section can be detected without interference from the communication signals.

It is understood, that a measurement in the third case 2 can be performed also, for example, with two filters inserted into the optical path 22; Here two filters would be used, a first filter attenuating in the region of 1310 nm and a second filter, attenuating in the region of 1550 nm.

With the knowledge of the teachings of the invention it will be obvious to those skilled in the art how other optical filters, such as high-pass, low-pass or band-pass etc. must be combined, with regard to the respective situation, for the measurement of reflected signals in measurement sections with traffic signals.

What is claimed is:

1. A measuring instrument for measurement of reflected optical signals, the measuring instrument comprising:
   an optical measurement section having a first communication signal at a first communication wavelength present thereon;
   an optical detector unit coupled to said optical measurement section for measuring optical signals therefrom;
   an optical signal source for generating a second communication signal having a second communication wavelength that is different from said first communication wavelength, and for impressing said second communication signal onto said optical measurement section;
   a switchable filter device positioned in an optical path between the optical measurement section and said optical detector unit for selectively attenuating said first communication wavelength and allowing only said second communication wavelength to reach said optical detector unit, or for selectively attenuating said second communication wavelength and allowing only said first communication wavelength to reach said optical detector unit; and
   control means for operating said switchable filter device to attenuate either said first communication wavelength or said second communication wavelength so as to impress onto said optical measurement section a non-attenuated one of said first communication wavelength or said second communication wavelength as the measuring signal.

2. A measuring instrument according to claim 1 wherein said measuring signal exhibits a longer wavelength than the wavelengths of any communication signal present on the measurement section.

3. A measuring instrument according to claim 1 wherein the signals of different wavelengths have wavelengths of 1.65 μm, 1.55 μm and 1.31 μm and said measuring signal wavelength is chosen to be one of said signals of different wavelengths that is not currently used for communication purposes.

4. A measuring instrument according to claim 1 wherein the switchable filter device contains plural optical filters and further includes means for selectively moving each one of said plural optical filters into and out of the optical path, said each one of said optical filters adapted to attenuate one of said different wavelengths.

5. A measuring instrument according to claim 4 wherein said means for selectively moving is an actuator and said plural optical filters are positioned on an axis of said actuator, said actuator controllable to move a selected one of said optical filters into the optical path of the switchable filter device.

6. A measuring instrument according to claim 5, wherein the actuator additionally tilts the filter(s) in an optical path of the switchable filter device.

7. A measuring instrument according to claim 4 wherein said means for selectively moving moves at least one of the optical filters into the optical path of the switchable filter device by rotation.

8. A measuring instrument according to claim 1 wherein the switchable filter device contains a first optical lens at an input, a second optical lens at an output and one or more optical filters that are selectively movable into the optical path between the first lens and the second lens for attenuation of one of said signals present on the optical measurement section that is used for communications purposes.

9. A measuring instrument according to claim 1, wherein the measuring instrument is an optical time domain reflectometer and said optical signal source means includes a first laser source, a second laser source and a third laser source, first and second wavelength-dependent couplers, a wavelength-independent coupler, a monitor photo diode and further, wherein the first laser source and second laser source are each are connected to an input of said first wavelength-dependent coupler via a first and a second optical fiber, and an output of the first wavelength-dependent coupler is connected to an input of the second wavelength-dependent coupler, and said third laser source is connected to the input of the second wavelength-independent coupler via an optical fiber, and an output of the second wavelength-dependent coupler is in optical connection with the input of the wavelength-independent coupler and the input of the switchable filter device also is in optical connection with the output of the wavelength-independent coupler.

10. A measuring instrument according to claim 9 wherein the switchable filter device is positioned in the optical path between the detector unit and the output of the wavelength-independent coupler.

11. An instrument for measurement of reflected optical signals, the instrument comprising:

an optical detector unit coupled to an optical measurement section having at least one optical communication signal impressed thereon, said optical detector unit for measuring optical signals from said optical measurement section;

an optical signal source for generating at least one optical test signal that is different from said optical communication signals, and for impressing said at least one optical test signal onto said optical measurement section;

a switchable filter device positioned in an optical path between said optical measurement section and said optical detector unit;

a controller for operating said switchable filter device to attenuate said at least one optical communication signal so as to allow said at least one optical test signal, reflected from said optical measurement section, to impinge on said optical detector unit; and a monitor diode, coupled to said optical measurement section, for detecting said at least one optical test signal and allowing for the control of said optical signal source.

12. A measuring instrument according to claim 11 wherein said at least one optical test signal has a longer wavelength than the wavelengths of any communication signals that are present on said optical measurement section.

13. A measuring instrument according to claim 11 wherein said at least one optical test signal has a wavelength selected from one of 1.65 µm, 1.55 µm, and 1.31 µm, and said at least one optical test signal is chosen to have a wavelength that is different from said at least one optical communication signal.

14. A measuring instrument according to claim 11 wherein said switchable filter device contains plural optical filters and further includes means for selectively moving each one of said plural optical filters into and out of the optical path, said individual ones of said optical filters adapted to attenuate one of said communication signals.

15. A measuring instrument according to claim 14 wherein said means for selectively moving is an actuator and said plural optical filters are positioned on an axis of said actuator, said actuator being controllable to move a selected one of said optical filters into the optical path of the switchable filter device.

16. A measuring instrument according to claim 15, wherein the actuator additionally tilts the filter(s) in the optical path of the switchable filter device.

17. A measuring instrument according to claim 14 wherein said means for selectively moving moves at least one of the optical filters into the optical path of the switchable filter device by rotation.

18. A measuring instrument according to claim 11 wherein the switchable filter device contains a first optical lens at an input, a second optical lens at an output and one or more optical filters that are selectively movable into the optical path between the first lens and the second lens for attenuation of one of said signals present on the optical measurement section that is used for communication purposes.

19. A measuring instrument according to claim 11, wherein the measuring instrument is an optical time domain reflectometer and said optical signal source includes a first laser source, a second laser source and a third laser source, first and second wavelength-dependent couplers, a wavelength-independent coupler and further, wherein the first laser source and second laser source are each are connected to an input of said first wavelength-dependent coupler via a first and a second optical fiber, and an output of the first wavelength-independent coupler is connected to an input of the second wavelength-dependent coupler, and said third laser source is connected to the input of the second wavelength-independent coupler via an optical fiber, and an output of the second wavelength-dependent coupler is in optical connection with the input of the wavelength-independent coupler and the input of the switchable filter device also is in optical connection with the output of the wavelength-independent coupler.

20. A measuring instrument according to claim 19 wherein the switchable filter device is positioned in the optical path between the detector unit and the output of the wavelength-independent coupler.

* * * * *